United States Patent [19]

Karki

[11] 4,150,191
[45] Apr. 17, 1979

[54] PROCESS FOR FORMING AN OPTICAL BLACK SURFACE AND SURFACE FORMED THEREBY

[75] Inventor: Kenneth A. Karki, Lakewood, Colo.

[73] Assignee: Martin Marietta Corporation, Bethesda, Md.

[21] Appl. No.: 946,786

[22] Filed: Sep. 28, 1978

Related U.S. Application Data

[63] Continuation-in-part of Ser. No. 778,031, Mar. 16, 1977, Pat. No. 4,123,591.

[51] Int. Cl.$^2$ .............................................. G02B 1/10
[52] U.S. Cl. .................................. 428/454; 428/446; 428/448; 428/450; 428/469; 428/428; 428/913; 427/160; 427/162; 427/372 B; 427/380; 427/427; 427/236; 427/344; 106/84; 350/276 SL
[58] Field of Search .................... 427/344, 372 B, 64, 427/239, 236, 162, 380, 427; 428/450, 913, 454, 446, 448, 469, 428; 106/74, 84; 350/276 R, 276 SL; 148/627

[56] References Cited

U.S. PATENT DOCUMENTS

| | | | |
|---|---|---|---|
| 2,076,183 | 4/1937 | Michaud et al. | 427/372 B |
| 3,070,460 | 12/1962 | Huppke | 428/450 |
| 3,249,459 | 5/1966 | Arnold et al. | 428/450 |
| 3,326,715 | 6/1967 | Twells | 427/372 B |
| 3,940,511 | 2/1976 | Deal et al. | 427/64 |

Primary Examiner—Ralph S. Kendall
Attorney, Agent, or Firm—Gay Chin; George W. Moxon, II; Phillip L. DeArment

[57] ABSTRACT

A method of making an optically black surface having a low reflectance of electromagnetic radiation, especially in the solar spectrum, a relatively high heat resistance, and a relatively low amount of off-gassing, comprising the steps of (a) Milling the following mixture of ingredients for up to about 50 minutes:

| Ingredient | Amount (% by weight) |
|---|---|
| Alkali metal silicate | 13–21 |
| Internal cure agent | 2–10 |
| Black pigment | 17–27 |
| Mica | 0–3 |
| Water | 50–70 | wherein the internal cure agent is selected from the group consisting of $CuO$, $Cu_2S$, $NiO \cdot Ni_2O_3$ and $Co_2O_3$.

(b) Coating the surface to be rendered optically black by
  (1) applying at least four or five coats of an alkali metal silicate and pigment composition, and
  (2) spraying at least the last two surface coatings, the last two surface coatings being the mixture, and (c) Curing at least the surface coatings by
  (1) exposing the coating to $NH_4OH$, and subsequently
  (2) rinsing the coating with water.

25 Claims, No Drawings

PROCESS FOR FORMING AN OPTICAL BLACK SURFACE AND SURFACE FORMED THEREBY

CROSS-REFERENCES TO RELATED APPLICATIONS

This application is a continuation-in-part of U.S. Ser. No. 778,031, now U.S. Pat. No. 4123591 filed Mar. 16, 1977 entitled "Process for Forming an Optical Black Surface and Surface Formed Thereby."

BACKGROUND OF THE INVENTION

This invention relates to optical coatings and surfaces and methods of making optical surfaces, and in particular, to inorganic, optical, black, silicate coatings and surfaces and methods of making such surfaces.

Optical coatings and surfaces are known and are used in instances where low light reflectivity, or conversely high light absorptivity, is required, that is, surfaces which absorb a substantial portion of the electromagnetic radiation, especially in the solar spectrum, to which they are exposed. The highest absorptivity is achieved with black coatings and surfaces. Uses for optical coatings and surfaces include the interiors of solar telescopes, binoculars, camera bodies, and the like, where reflected radiation will interfere with the radiation being observed or measured and solar panels where radiation, such as solar energy, is absorbed for conversion into some other form of energy, such as heat or electricity.

There has been much development work in the area of providing and developing metal bodies having a surface finish such that they absorb an extremely high percentage of ultra-violet, visible and infrared radiation, and therefore only a very low percentage of such radiation is reflected therefrom. Some of the development work has involved processes for treating the surface of the body involved to improve its optical character, and some has involved coatings and coating processes which result in improved optical characteristics for the surface of the body.

Among the known coatings for producing optical, especially black, surfaces are the organic black coatings and the so-called high temperature black coatings. The most well known of the organic coatings is the 3M (Minnesota Mining and Manufacturing Company) Nextel black velvet coating or print which has a composition by weight of approximately 16% pigment and 84% organic vehicle (basically a polyester base material). The pigment comprises approximately 20% carbon black and approximately 80% silicon dioxide. This material is commonly used for coatings in optical instruments such as telescope tubes, camera housings, vacuum chamber walls, etc.

In addition to the 3M Nextel black velvet paint, another well-known high absorbent of visible and infrared radiation is Parson's black. Parson's black consists of an alkyd lacquer containing carbon black. The carbon black, which is a powdery material, is adhered to the surface of a body to give that surface a high radiation absorption capability. Parson's black is, in general, a better visible and infrared absorbent than 3M Nextel black velvet paint.

Other optically black organic coatings have been developed, but they differ basically in the type of vehicle employed, such as epoxy and acrylic base coatings. None of the other organic black coatings, to applicant's knowledge, achieve the high degree of absorbency of visible and infrared radiation as does the 3M Nextel black velvet paint and Parson's black.

The 3M Nextel black velvet paint and Parson's black, both of which, as noted above, are known for their high absorption capability of visible and infrared radiation, have a substantial shortcoming in their lack of durability. The 3M black velvet paint is subject to chipping after moderate temperature exposure and hydrocarbon outgassing, both of which detrimentally affect the desirability of the product. In addition, because the organic binder will degrade at elevated temperatures, the organic coatings are restricted to low temperature applications. Further, Parson's black, which contains a relatively high percentage of powdery carbon black, also lacks durability, being very easily removed from any surface on which it is applied.

The so-called high temperature black coatings are not entirely free from the problems of organic binders since they basically comprise an organic material having inorganic components which are deposited as a residue. An example is the silicone resin based "high temperature" coating, which is commercially available. The inorganic surface is formed by coating a silicone resin on the substrate which is to have the optical surface, heating the coating to about 600° F. to 1000° F. to burn-off the organic binder which leaves an inorganic residue, and then heating the residue to in excess of 1000° F. to sinter the residue and thus form an inorganic layer on the substrate. Such a coating is inorganic and so will avoid generally the off-gassing problems associated with organic coatings, but such a coating process requires a large amount of expensive high temperature processing equipment, as well as processing steps, and if not properly heat treated, an organic residue may remain. Further, in order to avoid the formation of heat scale, which is associated with ferrous alloys during the high temperature treatment step, e.g., on the inside of tubes which are being optically coated, a means is required to protect the inside of the tubes, such as an inert gas purge inside the tubes or the like treatment, which only adds to the complexity and expense of the process.

Silicate coatings, such as sodium and potassium silicate, are well known for such purposes as high temperature resistance and corrosion resistance. Silicate coatings normally are not noted for their optical qualities, and in fact, are considered to have only average absorptivity or reflectivity levels. Often, silicate coatings are used as a primer, i.e., a protective coating which precedes the ultimate surface coating of paint. Further, while silicate coatings are inorganic and thus do not suffer from the problems of organic coatings, they are known, depending upon the formulation, to suffer from problems of durability and moisture resistance. Examples of silicate coatings are U.S. Pat. Nos. 2,076,183; 2,711,974; 3,416,939; 3,615,282; 3,620,791; and 3,769,050; and British Pat. No. 643,345.

U.S. Pat. No. 2,076,183 is of particular note because it discloses a heat resistant, permanent black, sodium silicate finish. But, such a coating would not be considered an optical black coating in that it would not have a sufficiently high solar absorptivity, especially as compared to, e.g., 3M Nextel velvet black. Thus the black of U.S. Pat. No. 2,076,183 would only be a general purpose black.

Thus, a need exists for an optical coating and surface which has a high absorptivity, and thus, a low reflectance of electromagnetic radiation, especially in the solar spectrum, and does not suffer from problems such as off-gassing or chipping or high temperature degradation.

SUMMARY OF THE INVENTION

The present invention is to an optical coating and surface and method of making an optical surface, and in particular to an inorganic, optical black, silicate coating and surface and method of making such a surface.

In accordance with the present invention, an optical surface is achieved which is equal to and/or exceeds the optical characteristics of the organic black coated surfaces, while using, in certain specified amounts, ordinary alkali metal silicates, so that the off-gassing and other problems associated with organic coatins are avoided. Further, the optical coating and surface of the present invention is tough and durable, such that, when it is handled, its optical properties will not necessarily be significantly impaired, and so that it can be used in high temperature environments. Also, the improved process of the present invention produces an optical surface having improved resistance to moisture.

Broadly, the invention comprises mixing an alkali metal silicate, an internal cure agent such as black copper, nickel or cobalt oxide or black copper sulfide, e.g., cupric oxide (CuO), mixed nickel oxide ($NiO \cdot Ni_2O_3$), or cuprous sulfide ($Cu_2S$), a black pigment, water, and optionally mica in the following proportions:

| Ingredient | Amount (% by weight) |
|---|---|
| Alkali metal silicate | 13-21 |
| Internal cure agent | 2-10 |
| Black pigment | 17-27 |
| Mica | 0-3 |
| Water | 50-70 |

The mixing is done in a mill, e.g., a ball mill, for a period of up to about 50 minutes when all the ingredients are present, and preferably there is an earlier or premilling of the mixture, but without the black pigment, optionally about ⅛ of the silicate and ¼ of the water, for up to about 3 hours, after which the pigment and balance of the silicate and water are added to the mixture for the milling of up to about 50 minutes.

Next, the surface of a substrate to be rendered optically black is coated with at least four coats of an inorganic mixture of alkali metal silicate solution and black pigment, which could be the above inorganic mixture, including spraying at least the last two coats, which must comprise the above mixture, and curing the surface coats by exposing the coats to $NH_4OH$ for at least about 16 hours and subsequently rinsing the surface coats with water for at least one minute. Each of the coats is allowed to air dry before proceeding with the next coat, and it is desirable, although not critical, for at least all of the coats prior to the final two coats to dry for a period of, e.g., about at least two to four hours in situ or for a period of about 3 to 5 minutes at between about 150° F. and 180° F., before spraying on the last two coats. Also, it may be desirable to prepare the surface prior to the coating by subjecting it to a roughening step to improve and/or to enhance the adhesion of the silicate coating to the substrate.

The resulting surfaces have solar absorptivities ($\alpha s$) of in excess of 97% and in some of the embodiments, in excess of 98%, while not suffering from the off-gassing problems associated with organic, optical black coatings, and being able to withstand relatively high temperatures, e.g., temperatures in excess of 1000° F., without producing any detrimental effects on the coatings Thus, the method and coated surface in accordance with the teachings of this invention are useful for coating solar absorptive materials, such as solar panels, or materials where low reflectance is required, such as in a camera or solar telescope.

The following are preferred embodiments wherein the silicate mixture comprises the following:

| Mixture A | |
|---|---|
| Ingredient | Amount |
| Potassium silicate solution | 280 ml |
| CuO | 40 g |
| Black pigment | 145 g |
| Water | 130 ml |

| Mixture B | |
|---|---|
| Ingredient | Amount |
| Potassium silicate solution | 280 ml |
| $Cu_2S$ | 25 g |
| Black pigment | 150 g |
| Mica (water white; 325 mesh) | 15 g |
| Water | 150 ml |

In these mixtures or embodiments, the potassium silicate solution has a weight percentage ratio of $K_2O$ to $SiO_2$ of about 1:2.50 and comprises about 71% by weight water. The preferred black pigment comprises a mixture of the black oxides of manganese, copper and iron. In embodiment A the mixture, without the black pigment, about ⅛ of the silicate solution and ¼ of the water, is ball milled for about 2 hours before the pigment and remainder of the silicate solution and water is added, after which the mixture is ball milled for an additional period of about 20 minutes. In embodiment B, the mixture, without the pigment, about ⅛ of the silicate solution and ¼ of the water, is ball milled for about 3 hours, and then the pigment and the remainder of the silicate solution and water are added and the mixture is ball milled for about an additional 20 minutes.

Each of these mixtures is applied in the manner summarized above and as will be discussed in detail hereinafter. When these mixtures are applied in the manner taught by this invention, a solar absorptivity of at least 97%, and as high as 98%, can be achieved. Thus, the present invention provides an optical surface which has a high absorptivity, especially in the solar spectrum, and does not suffer from the problems, such as off-gassing or chipping or high temperature degradation, associated with the organic optical coatings.

It is therefore an object of the present invention to provide an improved optical surface.

It is a further object of the present invention to provide a method of making an optical surface.

It is another object of the present invention to provide an inorganic, optical black coating and surface, which can be used at elevated temperatures without suffering from off-gassing problems.

It is yet another object of the present invention to provide a method of coating a surface which produces an inorganic, optical black surface which can be used at elevated temperatures without off-gassing.

These and other objects and advantages of the invention will become apparent upon consideration of the description and discussions which follow.

DETAILED DESCRIPTION OF THE INVENTION

Generally, the coating composition comprises an alkali-metal silicate, such as a sodium or potassium or lithium silicate, in a water solution, an internal cure agent, and a black pigment, such as a mixture of the black oxides of manganese, iron and copper. By ball milling the mixture in the manner which will be hereinafter set forth, applying at least four coats of the mixture in the manner to be discussed further below, and curing in the manner to be discussed further below, the mixing/ball milling, applying and curing steps being the essence of this invention, an inorganic, optical black coating which is durable and has a high solar absorptivity equal to or in excess of 97% is obtained.

The alkali-metal silicate can be any of the commercially available, low-alkali, alkali-metal silicate solutions, will comprise about 13 to 21% by weight of the coating mixture, can have a weight percentage ratio of alkali-metal oxide to silicon dioxide in the range of 1:2.10 to 1:3.75, and will comprise about 50% by weight to 75% by weight water. Additionally, the coating mixture will contain 50% to 70% by weight water. Part of the water is contributed by the silicate solution, and so an additional amount of water is added to the coating mixture so that it will achieve a coatable/sprayable consistency. The preferred silicate solution for the present invention is potassium silicate solution.

The black pigment preferably comprises the black oxides of manganese, copper and iron produced by the co-calcination at from about 800° F. to 1400° F. of compounds of these metals which yield their oxides during calcination, such as is disclosed in U.S. Pat. No. 2,811,463, which disclosure is herein incorporated by reference. Other black pigments could be employed, but the black oxides of Mn, Fe and Cu produced the best results when used in accordance with the teachings of the present invention. The pigment comprises about 17% to 27% by weight of the mixture. If more than 27% by weight pigment is employed, the coating is difficult to control and a slight overspray can lead to spalling of the coating when rubbed by hand.

As disclosed in U.S. Pat. No. 2,811,463, the pigment can be made by directly calcining the oxides or those compounds of manganese, copper and iron which yield their oxides upon calcination or by first coprecipitating and then calcining, and comprises from 20 to 80 parts by weight of MnO, from 20 to 80 parts by weight of CuO and from 5 to 50 parts by weight of FeO.

The internal cure agent, i.e., the black copper, nickel and cobalt oxides and black copper sulfides, to be employed are commercially available materials, usually in a powdered form. Black copper oxide and sulfide are cupric oxide (CuO) and cuprous sulfide ($Cu_2S$) respectively, and are available as technical grade powder. The black nickel and cobalt oxides used are mixed nickel oxide ($NiO \cdot Ni_2O_3$) and cobaltic oxide ($Co_2O_3$), respectively. The black copper oxide employed to cure the silicate coating is different from the black copper oxide employed, preferably, as the pigment because the copper oxide pigment is less reactive due to the calcining employed in making the pigment and in the preferred pigment, i.e., the mixed copper, manganese and iron oxide pigment, all of the oxides are believed to be fused together.

The mixture of the present invention, basically a silicate, cupric oxide, nickelic oxide, cobaltic oxide or cuprous sulfide, pigment, water, and optionally mica, e.g. water white mica having a 325 mesh particle size (to improve the handling of the mixture), is both mixed and ground (i.e., somewhat reduced in size) by ball milling or the like. The ball milling can be done in any conventional manner using a commercially available ball mill and balls or cylinders. For example, a convenient size would be ½" diameter by ½" long cylinders or ½" to 1" diameter balls. What is critical in the process of the present invention, and to achieve an optical surface in accordance with the present invention, is the length of time to which the mixture, which is subsequently applied as the final surface coats, especially when it includes the pigment, is subjected to ball milling. When the mixture includes the pigment, the ball milling should not exceed 50 minutes, preferably not in excess of 30 minutes or in the range of from about 10 minutes to about 30 minutes, with a milling time of 20 minutes being further preferred. When the mixture does not contain the pigment, and preferably although not necessarily about ⅔ of the silicate solution and ¼ of the water, it can be ball milled for up to or in excess of about 3 hours and, after the pigment and the remainder of the silicate and water is added, for an additional time of up to about 50 minutes. The initial ball milling, i.e., the ball milling without the pigment and part of the silicate solution and the water, is not critical but is desirable, and is done so that the mixture will be sprayable, and so a period of up to 3 hours is only exemplary. Thus, while there is no criticality in the ball milling equipment employed, the length of time involved when the pigment is present is critical and is a milling time period which is much less than is employed for conventional paints, including conventional silicate coatings.

The mixture is preferably applied to the surface to be rendered optically black by spraying, although it is the top two layers which must be within the critical limits in terms of content and ball milling, and also must be sprayed. That is, some of the layers or coats could be applied by brushing or rubbing or roll coating the mixture, using conventional brushing or rubbing or roll coating means, or could contain less pigment than the critical limits or could be ball milled in excess of the critical limits, but the top two coats must be within the critical composition, mixed within the critical limits, and be sprayed. If the top coats are not sprayed, the surface will have an irregular surface, e.g., brush marks if a brush is used, and will not achieve the desired optical qualities and characteristics. Any conventional spraying apparatus can be employed. Normally, a larger nozzle, e.g., one which is used for zinc rich sprays, is employed in view of the granular nature of the mixture.

There is no criticality in the spraying process per se, and conventional spraying techniques can be employed. That is, enough of the mixture is sprayed on to form a layer or coat. The spraying should be on the dry side, i.e., so that the coating is not a shiny, wet coating (a condition known in the spray painting art), but the coating is too dry if the spraying should produce an overspray condition (also known in the spray painting art). As is conventional in the art, each coat or layer is allowed to become dry to the eye, e.g., air dry for about five minutes, before applying the next coat, or else caking and running will occur. This is continued until there are 4, which would amount to a total coating thickness of about 2 to about 3 mils. It is desirable, although not critical in the process of invention, that the coats before the last two coats be allowed to dry before applying these last two coats. The term drying is intended to include drying the coating enough so that a substantial amount of the moisture in the coating is removed and the silicate coating is at least partially cured and this would include allowing the coats to dry at ambient temperature and relative humidity for about 2 to 4 hours, drying the coats for a period of 3 to 5 minutes at 180° F. to 150° F. at up to about 50% relative humidity, or combination thereof.

The surfaces to which the mixture can be applied include metals, glass and porcelains or ceramics. The preferred surfaces are metals, with steel, aluminum and copper being the preferred metals. It is best to pretreat the surface so that the adherence of the silicate coating is enhanced. This would include cleaning the surface and, in the instance of the metals, roughening the surface. The surface can be cleaned using conventional surface cleaning techniques, such as vapor honing or sand blasting and chemical etching, such as with an alkali or an acid solution, and preferably followed by a de-smutting step, such as with a chromic acid/nitric acid de-smutting solution. For example, when the surface is steel, it can be roughened by bombarding it with grit, such as alumina or silicon carbide grit delivered using pressurized air. When the surface is aluminum, a chemical etch should be sufficient. Thus, while surface roughening, in the case of metals, is preferred and desirable, it is not critical.

After the coating of the present invention is applied, all of the coating, or at least the last two coats, are cured by exposing the surface to $NH_4OH$ for a period of at least about 16 hours, preferably for about 16 to 24 hours, and subsequently rinsing the coating with water for at least one minute, preferably for a period of about 10 to 20 minutes, with a 15 minute rinse being preferred also. The exposing can be accomplished by immersing, rinsing, spraying, or the like, the surface in moisture laden ammonia gas, i.e., $NH_3$ gas plus 100% relative humidity, or $NH_4OH$ liquid alone or in combination with $NH_4Cl$. The precise process would depend upon the size and nature of the surface. There is no criticality in the manner of exposing and rinsing the surface, so long as each is sufficient to cure at least the surface coatings. There is no criticality in the water to be employed, although distilled water is preferred, but it is important to minimize impurities to prevent staining.

Although not wishing to be bound by any particular theory, it is believed that the copper (or nickel or cobalt) in the oxide or sulfide compounds are solubilized in the ammonium hydroxide and react with the silicate to form insoluble copper (or nickel or cobalt) silicate. Thus, the ammonium hydroxide coupled with the copper or nickel or cobalt compounds will internally cure the silicate coating and provide improved resistance to moisture. Further, the curing of the silicate coating is done at room or ambient temperature. The rinse step is important because the potassium ions from the potassium silicate are removed. It is believed that it is reaction of the potassium (or sodium or lithium) in the silicate with water or carbon dioxide from the air which causes the white coating (assumed to be $K_2CO_3$ or $Na_2CO_3$) and therefore failure of prior inorganic black coatings.

The method of preparing the mixture and coating the mixture can be varied, within certain limitations, to provide the desirable ingredients in the proper proportions and achieve the desired surface characteristics. Therefore, the following examples are provided to illustrate further the invention, while not intended to limit the scope of the invention in any way.

EXAMPLE I

The following mixture of ingredients were ball milled:

| Ingredient | Amount |
|---|---|
| Silicate solution | 200 ml |
| Black pigment | 175 g |
| Distilled water | 225 ml |

The silicate solution was "N" silicate solution, a commercially available silicate sold by the Philadelphia Quartz Company, comprising sodium silicate solution having a weight percentage ratio of soda to silica (i.e., %$Na_2O$ to %$SiO_2$) of 1:3.22 and comprising 62.4% water. The black pigment was Ferro black pigment No. F6331, which comprises the black oxides of manganese, iron and copper and which is taught by U.S. Pat. No. 2,811,463.

The mixture was placed in a one liter polypropylene jar which had been filled to approximately ¼ full with a pound of ½" diameter by ½" tall ceramic cylinders. The mixture and cylinders filled the jar to approximately ½ full. The jar was then rotated about its axis at a speed of 90 to 100 rpm for a period of about 15 minutes. The mixture had achieved a sprayable consistency.

Next, the mixture of Example I was coated on an aluminum panel which had been subjected to a chemical milling with a caustic soda (NaOH) etch followed by a de-smutting step. The mixture of Example I was preceded by three rub coats and two spray coats of mixture of the same ingredients as in Example I, except that the mixture was ball milled for between 3 and 4 hours. In a rub coat, a sponge containing the coating material is rubbed across the metal surface and leaves a thin coating equal to about one-half of a spray or brush coat. The mixture of Example I was then applied by spraying on four coats with a drying step (3–5 minutes in an oven at between 180° F. and 150° F.) before the last two coats were sprayed on. In addition, two other aluminum panels were prepared by subjecting them to chemical milling and de-smutting and then coating them with commercially available organic black coatings. The Black Velvet is a 3M coating, and it was applied in two coats according to the manufacturers instructions. 107-66Z-poxy is an epoxy black manufactured by Andrew Brown and it was applied in one coat. The solar absorptivity of each coated panel was measured using a Beckman DK-2A ratio recording spectrophotometer with Gier-Dunkle integrating sphere. Reflectance readings are obtained, and 1.0 minus reflectance gives absorptance. An absorptivity value of 1.0 would mean that the surface was totally light absorptive. The results of the tests are set forth in Table I. It should be noted that these measurements were made at Air Mass Zero (AM-0) which is equivalent to that found in outer space. At AM-2, which is what one would find in North America, the absorptivity values would be higher.

Table I

| | Solar Absorptance $a_s$ at AM-O | | |
|---|---|---|---|
| | 15° | 30° | 45° |
| Example I | 0.985 | 0.984 | 0.982 |
| Black Velvet | 0.975 | 0.972 | 0.967 |

Table I-continued

| | Solar Absorptance $a_s$ at AM-0 | | |
|---|---|---|---|
| | 15° | 30° | 45° |
| 107-66Z-poxy | 0.950 | 0.946 | 0.934 |

EXAMPLE II

An aluminum panel was prepared by subjecting it to a chemical etch. Next, the panel was coated by applying two rub coats of a mixture similar to that of Example I except that it contained only 75 g of pigment (instead of 175 g) and two spray coats of a similar mixture except that it contained only 125 g of pigment, and each of these coatings were mixed in one pass on a roll mill such as would be equivalent to the mixing in a ball mill. The use of a roll mill is an alternative to the use of a ball mill, but the ball mill is preferred since it is easier to control the amount of mixing and grinding of the mixture. Next, five coats of the mixture of Example I, except that it had been mixed on a roll mill for a period equivalent to ball milling for 15 minutes, were spray coated on the panel with a drying step (air dried for about 2 hours) prior to the application of the last three coats.

The absorptivity of the thus coated panels was measured at AM-0 and was determined to be as follows: 0.975 at 15°; 0.974 at 30°; and 0.971 at 45°.

In addition, a portion of the coating was scraped off (representative sample of all of the layers of the coating), using an exacto knife, and placed in a platinum crucible (the sample was approximately 21 mg.) for a thermogravimetric analysis/residual gas analysis (TGA/RGA) in order to determine the outgassing (or off-gassing) characteristics of the coating. This test, the results of which are set forth in Table II, shows that, unlike organic coatings, which give off organic combustion or degradation products which could foul, e.g., a window placed over the coating, the coatings of the present invention do not result in organic condensates.

Still further, two panels, one an aluminum panel which had been prepared by a chemical etch and the other a stainless steel panel which had been prepared by vapor honing, were coated with the coating and in the manner of Example II and were subjected to a thermal shock test.

In the thermal shock test, a coated steel or aluminum panel was plunged into liquid nitrogen ($LN_2$ at $-300°$ F.) and removed to air when bubbling of the $LN_2$ stopped, indicating equilibrium. Generally upon removal, white spots were formed on the surface which

TABLE II

| Temperature °C. | Weight Loss, % | Outgassing Masses |
|---|---|---|
| 50 | 0.0 | water |
| 100 | 1.15 | water & carbon dioxide[1] |
| 200 | 2.99 | water & carbon dioxide |
| 300 | 4.40 | carbon dioxide |
| 400 | 5.27 | — |
| 500 | 5.51 | carbon dioxide (trace) |
| 600 | 5.65 | oxygen or sulphur |
| 700 | 5.98 | oxygen or sulphur |
| 800 | 6.46 | oxygen, carbon dioxide, & undetermined inorganic[2] |
| 900 | 7.18 | nitrogen or carbon monoxide, oxygen, carbon dioxide, undetermined inorganics |
| 1000 | 7.90 | nitrogen or carbon monoxide, oxygen, |

TABLE II-continued

| Temperature °C. | Weight Loss, % | Outgassing Masses |
|---|---|---|
| | | carbon dioxide, undetermined inorganics |

[1] Since the coating is thinned with water and is alkaline, it would absorb the mildly acidic carbon dioxide and these would be the first materials given off.
[2] These masses, although unknown, are not organic, and are presumed to be from a minor break-down of the pigment or binder due to the high temperatures involved.

disappeared as the panels warmed up. The spots were believed to be water vapor or $CO_2$ condensed from the air. In some instances, the surface was slightly mottled, possibly due to localized spalling. Spalling can occur when the water inherent in the coating freezes and expands, or when liquid nitrogen permeates into surface voids and expands upon warming. The conclusion of the test is that the coating was considered to have remained generally and satisfactorily adhered to both panels, and remained essentially black, and therefore is a stable and tough coating.

Finally, a 12" by 12" aluminum panel, which had been prepared by chemical etching, was coated with the mixture and in the manner of Example II. This panel was then subjected to a vibration test.

In the vibration test, a coated panel was vibrated at 25, 50, and 70 $G_{rms}$ (root mean square gravities) for three minutes at each level with random vibration from 25 to 2000 Hz. The plane of vibration was through the thickness of the panel, considered the most severe mode. Twenty-five $G_{rms}$ is a typical vibration load for structures which would use an optical black coating. In this test, the panel passed without any flaking or loss of adhesion.

EXAMPLE III

The following mixture of ingredients were ball milled:

| Ingredient | Amount |
|---|---|
| Silicate solution | 280 ml |
| Black pigment | 168 g |
| Distilled water | 170 ml |

The silicate solution was Kasil No. 1, a commercially available silicate sold by the Philadelphia Quartz Company, comprising potassium silicate solution having a weight percentage ratio of potassium oxide to silica (i.e., % $K_2O$ to % $SiO_2$) of 1:2.50 and comprising 70.9% water. The black pigment was Ferro black pigment No. F6331, which comprises the black oxides of manganese, iron and copper and which is taught by U.S. Pat. No. 2,811,463.

The mixture was placed in a one liter polypropylene jar which had been filled to approximately ½ full with a pound of ¼" diameter by ¼" tall ceramic cylinders, until both the mixture and cylinders filled the jar to approximately ½ full. The jar was then rotated about its axis at a speed of 90 to 100 rpm for a period of about 15 minutes. The mixture had achieved a sprayable consistency.

An aluminum panel, which had been prepared by chemical milling, was coated with three rub coats and 6 spray coats of the mixture of Example III except that it was more highly milled (3 to 4 hours). Next and after the coating was allowed to dry in an oven for 3 to 5 minutes at 180° F. to 150° F., two spray coats of the mixture of Example III were coated on. The absorptivity of the coating was measured at AM-0 and was found

EXAMPLE IV

The following mixture of ingredients were ball milled:

| Ingredient | Amount |
| --- | --- |
| Silicate solution | 160 ml |
| Black pigment | 130 g |
| Kaolin | 10 g |
| Mica | 10 g |
| Distilled water | 125 ml |

The silicate solution and pigment were the same as those used in Example I. The kaolin used was a commercially available, National Formulary (NF) grade kaolin. The mica employed was 325 mesh, water white mica.

All of the ingredients in the mixture, except for the black pigment, were placed in an 00 size ceramic jar which had been filled to approximately ⅓ full with ½" diameter of ½" tall ceramic cylinders, so that both the mixture and the cylinders filled the jar to approximately ⅓ full. The jar was then rotated about its axis at a speed of 90 to 100 rpm for a period of about one hour. Then, the pigment was added to the ingredients already in the jar and the mixture was then ball milled for an additional 25 minutes, at the same speed as previously used. The mixture had achieved a sprayable consistency.

The mixture of Example IV was applied in four coats to an aluminum panel, prepared by chemical etching, by brushing on two coats, then drying in an oven for 3 to 5 minutes at 180° F. to 150° F., and finally spraying on two surface coats. The resulting surface had a solar absorptivity ($\alpha_s$) of 0.970 at 15° at AM-0 and 0.971 at 15° at AM-2.

EXAMPLE V

The following mixture of ingredients were ball milled:

| Ingredient | Amount |
| --- | --- |
| silicate solution | 280 ml |
| CuO | 40 g |
| Black pigment | 145 g |
| Distilled water | 130 ml |

The silicate solution was the same as that used in Example III, while the pigment was the same as that used in Example I.

All of the ingredients in the mixture, except for the black pigment, some of silicate solution and 30 ml of water, were placed in an 00 size ceramic jar which had been filled to approximately ⅓ full with ½" diameter by ½" tall ceramic cylinders, so that both the mixture and the cylinders filled the jar to approximately ⅓ full. The jar was then rotated about its axis at a speed of 90 to 100 rpm for a period of about 2 hours. Then, the pigment and the remainder of the silicate solution and water were added to the ingredients already in the jar and the mixture was then ball milled for an additional 18 minutes, at the same speed as previously used. The mixture had achieved a sprayable consistency.

EXAMPLE VI

The following mixture of ingredients were ball milled:

| Ingredient | Amount |
| --- | --- |
| Silicate solution | 280 ml |
| $Cu_2S$ | 25 g |
| Black pigment | 15 g |
| Mica | 145 g |
| Distilled water | 125 ml |

The silicate solution was the same as that used in Example III, while the pigment was the same as that used in Example I. The mica employed was water white mica having a 325 mesh particle size. The mica appeared to improve the handling of the mixture.

All of the ingredients in the mixture, except for the black pigment, some of silicate solution and 25 ml of water, were placed in an 00 size ceramic jar which had been filled to approximately ⅓ full with ½" diameter by ½" tall ceramic cylinders, so that both the mixture and the cylinders filled the jar to approximately ⅓ full. The jar was then rotated about its axis at a speed of 90 to 100 rpm for a period of about 3 hours. Then, the pigment and the remainder of the silicate solution and water were added to the ingredients already in the jar and the mixture was then ball milled for an additional 40 minutes, at the same speed as previously used. The mixture had achieved a sprayable consistency.

Next, the mixtures of Examples V and VI were applied to seven aluminum panels, which were separated by chemically etching and which had been previously coated with three coats (one rub coat and two spray coats) of an alkali metal silicate and pigment composition, which composition was basically the composition of Example I, except that it additionally contained zinc oxide (ZnO), was ball milled for between about 3 and 4 hours, and was in the following proportions:

| Ingredient | Amount |
| --- | --- |
| Silicate solution | 120 ml |
| ZnO | 75 g |
| Black pigment | 20 g |
| Distilled water | 75 ml |

Zinc oxide was used to improve the corrosion resistance of the underlying aluminum substrate, a problem independent of the demonstration of the present invention, and the evaluation of ZnO was carried on simultaneously with the tests for the present invention.

After the first three coats dried, two spray coats of the mixtures of Examples V and VI were applied so that there were a total of 5 coats on each panel, and three panels had a surface comprised of the mixture of Example V, while four had a surface comprised of the mixture of Example VI. The coatings on the panels were then cured by immersing the panels in a container containing a solution made by mixing equal parts of concentrated $NH_4OH$ and $NH_4Cl$ solution (made by mixing 18 g of $NH_4Cl$ with 100 ml of distilled water) or by exposing the panels to an atmosphere of $NH_3$ gas and 100% relative humidity by placing the panels in a closed chamber, such as a bell jar, containing an open container of a solution of $NH_4OH$, for the time periods as shown in Table III, and then rinsing the panel for about one minute with distilled water.

The humidity test was run by placing the panels in a standard humidity chamber so that the panels were exposed to 100% relative humidity at constant (40° C.) temperature. As discussed earlier, the test was for the purpose of showing aluminum panel corrosion as well as stability of the silicate coating. As can be seen the coating overall was stable under the test conditions. Further, as can be seen from Table III, only panels C and G were evaluated for their absorptivity, and this was after the humidity chamber test, and the resulting surface of panel C had a solar absorptivity ($\alpha s$) of 0.979 at 15° at AM-2, while the absorptivity of panel G was 0.980 at 15° at AM-2. The other panels were visually evaluated only, i.e., by a side-by-side human eye comparison with the panels which were evaluated, and were felt to be equivalent overall to those panels which were evaluated, except as noted. These panels were not actually measured due to the metal corrosion spots. Further, panel A, although not appearing as black as the other panels, had originally stained and wicked areas (wicking is where moisture collected on the floor of the bell jar and "wicked" up the surface of the panel) and it was concluded that this was the basis for the deficiency.

TABLE III

| Panel | Surface Coats Mix Example | Exposure Step Time | NH4OH Source | Rinse Step Time | Humidity Test Time | Comment | Solar Absorptivity ($\alpha s$) |
| --- | --- | --- | --- | --- | --- | --- | --- |
| A | V | 69 hours | NH3(g) + H2O Vapor | 1 min. | 16 days | Not as black as others (approx. 0.96 to 0.97) Originally stained and wick areas. Isolated corrosion in stained areas. | — |
| B | V | 24 hours | NH4OH + NH4Cl Solution | 1 min. | 17 days | Isolated corrosion spots at edges & Unusual (contamination) streak at lower part of panel | — |
| C | V | 16 hours | " | 1 min. | 18 days | Excellent; no corrosion | 0.979 |
| D | VI | 16 hours | " | 1 min. | 9 days | Small amount of edge corrosion and isolated spots in middle | — |
| E | VI | 3 days | NH3(g) + H2O Vapor | 1 min. | 16 days | No change from original, slightly mottled condition, except dark stain and trace corrosion at lower left | — |
| F | VI | 4 days | " | 1 min. | 12 days | No change in black. Trace of mottling near bottom. Edges exhibit slight cracking | — |
| G | VI | 24 hours | NH4OH + NH4Cl Solution | 1 min. | 17 days | No change | 0.980 |

Still further, the mottling, which was noted, was due to impurities which causes a variation in the absorptivity. That is, the impurities cause some areas to be darker than others, and so the panel had a "mottled" appearance.

As is seen, the coating of the present invention when applied in the manner of the present invention produces a surface which possesses a high level of solar absorptivity while being tough and thermally stable. The coats before the final two spray coats can be more highly milled or contain less pigment or contain corrosion inhibitors, such as ZnO, but the optical coating is only obtained when the final two surface coats are within the critical limits. Because the earlier coats are not as critical (they still should be inorganic silicate coatings), the coating of the present invention is easily repaired. Where the surface has been damaged, if there is still a "base" coat, i.e., there are enough inorganic base coats to be equivalent to three original base coats, then only two surface coats need be applied in the manner taught by the invention to the surface to restore its optical qualities.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What I claim is:

1. A method for making an optically black surface having a low reflectance of electromagnetic radiation, especially in the solar spectrum, a relatively high heat resistance, and a relatively low amount of off-gassing, comprising the steps of
    (a) Milling the following mixture of ingredients for up to about 50 minutes:

| Ingredient | Amount (% by weight) |
| --- | --- |
| Alkali metal silicate | 13–21 |
| Internal cure agent | 2–10 |
| Black pigment | 17–27 |
| Mica | 0–3 |
| Water | 50–70 | wherein said internal cure agent is selected from the group consisting of $CuO$, $Cu_2S$, $Ni_2O_3$, and $Co_2O_3$
    (b) Coating the surface to be rendered optically black by
        (1) applying at least four coats of an alkali metal silicate and pigment composition, and
        (2) spraying at least the last two surface coatings, said last two surface coatings being said mixture, and
    (c) Curing at least said surface coatings by
        (1) exposing said coating to NH4OH, and subsequently
        (2) rinsing said coating with water.

2. A method according to claim 1 wherein said NH4OH is supplied by using NH3 gas in combination with water (H2O) vapor, or NH4OH alone or in combination with NH4Cl.

3. A method according to claim 1 wherein said exposing step is for a period of time sufficient to cure said alkali metal silicate to an insoluble metal silicate and rinsing step is for a period of time sufficient to remove any alkali metal ions.

4. A method according to claim 3 wherein said exposing step is for at least about 16 hours and said rinsing step is for at least one minute.

5. A method according to claim 4 wherein said exposing step is for the period of from about 16 hours to about 24 hours.

6. A method according to claim 4 wherein said rinsing step is for a period of between about 10 and about 20 minutes.

7. A method according to claim 4 wherein said rinsing step is for a period of about 15 minutes.

8. A method according to claim 1 wherein said alkali metal silicate is potassium silicate.

9. A method according to claim 1 wherein said internal cure agent selected from the group consisting of CuO and $Cu_2S$, and when said internal cure agent is $Cu_2S$, said $Cu_2S$ is present in an amount of between about 1 and 4% by weight based upon the weight of the mixture and said mixture is milled for between 10 and 30 minutes, and when said internal cure agent is CuO, said CuO is present in an amount of between 4 and 8% by weight based upon the weight of the mixture and said mixture is milled for about 10 minutes.

10. A method according to claim 1 wherein said alkali metal silicate is potassium silicate solution wherein the percentage weight ratio of $K_2O$ to $SiO_2$ is in the range of 1:2.10 to 1:2.50.

11. A method according to claim 1 wherein said mixture comprises the following:

| Ingredient | Amount |
| --- | --- |
| Potassium silicate solution | 280 ml |
| $Cu_2S$ | 25 g |
| Black pigment | 150 g |
| Mica | 15 g |
| Water | 150 ml |

12. A method according to claim 1 wherein said mixture comprises the following:

| Ingredient | Amount |
| --- | --- |
| Potassium silicate solution | 280 ml |
| CuO | 40 g |
| Black pigment | 145 g |
| Water | 130 ml |

13. A method according to claim 1 wherein said pigment comprises a mixture of the black oxides of manganese, copper and iron.

14. A method according to claim 1 wherein said alkali metal silicate and pigment composition comprises the following:

| Ingredient | Amount (% by weight) |
| --- | --- |
| Alkali metal silicate | 5–21 |
| Black pigment | 5–27 |
| Mica | 0–3 |
| ZnO | 0–23 |
| Water | 50–70 |

15. An optically black surface, having a low reflectance of electromagnetic radiation, especially in the solar spectrum, a relatively high heat resistance, and a relatively low amount of off-gassing, made in accordance with the method of claim 1.

16. A method of making an optically black surface having a low reflectance of electromagnetic radiation, especially in the solar spectrum, a relatively high heat resistance, and a relatively low amount of off-gassing, comprising the steps of:

(a) Milling the following mixture of ingredients, less the black pigment, approximately ⅓ of the silicate and ¼ of the water, for a period of up to about 3 hours:

| Ingredient | Amount (% by weight) |
| --- | --- |
| Alkali metal silicate | 13 to 21 |
| CuO or $Cu_2S$ | 2 to 10 |
| Black pigment | 17 to 27 |
| Mica | 0 to 3 |
| Water | 50 to 70 |

(b) Adding said black pigment and the remainder of said silicate and said water to said mixture and continuing the ball milling for an additional period of up to 50 minutes, (c) Preparing said surface by treating said surface in a manner which will enhance the adhesion of the silicate coating to the surface, (d) Coating the surface to be rendered optically black
  (1) by applying at least four coats of an alkali metal silicate and pigment composition, and
  (2) by spraying at least the last two coats, said last two coats comprising said mixture, and (e) Curing at least said surface coatings by
  (1) exposing said coating to $NH_4OH$ for at least about 16 hours, and
  (2) rinsing said coating with water for at least one minute.

17. A method according to claim 16 wherein said mica comprises water white mica having a particle size of about 325 mesh.

18. A method according to claim 16 wherein the alkali metal silicate is in the form of an alkali metal silicate solution.

19. A method according to claim 16 wherein said alkali metal silicate is potassium silicate.

20. A method according to claim 16 wherein said alkali metal silicate is potassium silicate solution wherein the percentage weight ratio of $K_2O$ to $SiO_2$ is in the range of 1:2.10 to 1:2.50.

21. A method according to claim 16 wherein said pigment comprises a mixture of the black oxides of manganese, copper and iron.

22. A method according to claim 16 wherein said mixture comprises the following:

| Ingredient | Amount |
| --- | --- |
| Potassium silicate solution | 280 ml |
| $Cu_2S$ | 25 g |
| Black pigment | 150 g |
| Mica | 15 g |
| Water | 150 ml |

23. A method according to claim 16 wherein said mixture comprises the following:

| Ingredient | Amount |
| --- | --- |
| Potassium silicate solution | 280 ml |
| CuO | 40 g |
| Black pigment | 145 g |
| Water | 130 ml |

24. A method according to claim 16 wherein when said mixture contains $Cu_2S$, said $Cu_2S$ is present in an amount of between about 1 and 4% by weight based upon the weight of the mixture and said mixture is milled for between 10 and 30 minutes, and when said mixture contains CuO, said CuO is present in an amount of between 4 and 8% by weight based upon the weight of the mixture and said mixture is milled for between about 10 and 30 minutes.

25. An optically black surface, having a low reflectance of electromagnetic radiation, especially in the solar spectrum, a relatively high heat resistance, and a relatively low amount of off-gassing, made in accordance with the method of claim 16.

* * * * *